US012015172B2

(12) United States Patent
Yang et al.

(10) Patent No.: US 12,015,172 B2
(45) Date of Patent: *Jun. 18, 2024

(54) BATTERY PACK INCLUDING CONNECTION PLATE, ELECTRONIC DEVICE AND VEHICLE

(71) Applicant: LG CHEM, LTD., Seoul (KR)

(72) Inventors: Jin-Oh Yang, Daejeon (KR); Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 676 days.

This patent is subject to a terminal disclaimer.

(21) Appl. No.: 17/279,343

(22) PCT Filed: Jul. 2, 2020

(86) PCT No.: PCT/KR2020/008689
§ 371 (c)(1),
(2) Date: Mar. 24, 2021

(87) PCT Pub. No.: WO2021/002710
PCT Pub. Date: Jan. 7, 2021

(65) Prior Publication Data
US 2021/0408640 A1 Dec. 30, 2021

(30) Foreign Application Priority Data
Jul. 2, 2019 (KR) .......................... 10-2019-0079603

(51) Int. Cl.
*H01M 50/503* (2021.01)
*H01M 10/44* (2006.01)
(Continued)

(52) U.S. Cl.
CPC ......... *H01M 50/503* (2021.01); *H01M 10/44* (2013.01); *H01M 10/613* (2015.04);
(Continued)

(58) Field of Classification Search
None
See application file for complete search history.

(56) References Cited

U.S. PATENT DOCUMENTS

| 3,167,458 A * | 1/1965 | Brazell | H01M 50/209 |
| | | | 429/10 |
| 6,982,131 B1 * | 1/2006 | Hamada | H01M 50/567 |
| | | | 429/151 |

(Continued)

FOREIGN PATENT DOCUMENTS

| CN | 103597627 A | 2/2014 |
| CN | 105122498 A | 12/2015 |

(Continued)

OTHER PUBLICATIONS

Extended European Search Report issued in corresponding European Patent Application No. 20834194.1, dated Feb. 28, 2022.

(Continued)

*Primary Examiner* — Gregg Cantelmo
(74) *Attorney, Agent, or Firm* — Morgan, Lewis & Bockius LLP (57) ABSTRACT

A battery pack includes a plurality of battery modules disposed in a front and rear direction. Each of the battery modules includes a plurality of battery cells; a module housing; and a connection plate including a contact portion at an upper or lower portion of the plurality of battery cells and having a plurality of connection terminals in a portion thereof and respectively electrically contacted and connected to the electrode terminals at the plurality of battery cells, and a connection portion bent at least once from one end of the contact portion to extend in at least one direction among an upper direction, a lower direction, a front direction and a rear direction so that the bent and extending region of the connection portion is on a left or right outer (Continued)

wall of the module housing to contact a part of a connection plate of another battery module.

17 Claims, 7 Drawing Sheets

(51) Int. Cl.
*H01M 10/613* (2014.01)
*H01M 10/643* (2014.01)
*H01M 10/6562* (2014.01)
*H01M 50/213* (2021.01)
*H01M 50/249* (2021.01)
*H01M 50/264* (2021.01)
*H01M 50/505* (2021.01)
*H01M 50/516* (2021.01)
*H01M 50/528* (2021.01)

(52) U.S. Cl.
CPC ..... *H01M 10/643* (2015.04); *H01M 10/6562* (2015.04); *H01M 50/213* (2021.01); *H01M 50/249* (2021.01); *H01M 50/264* (2021.01); *H01M 50/505* (2021.01); *H01M 50/516* (2021.01); *H01M 50/528* (2021.01); *H01M 2220/20* (2013.01)

(56) References Cited

U.S. PATENT DOCUMENTS

| | | |
|---|---|---|
| 2011/0293986 A1 | 12/2011 | Kozu |
| 2012/0247107 A1 | 10/2012 | Balk et al. |
| 2012/0270097 A1 | 10/2012 | Yasui et al. |
| 2013/0130073 A1 | 5/2013 | Kim et al. |
| 2015/0221922 A1 | 8/2015 | Kim et al. |
| 2015/0255225 A1 | 9/2015 | Kusaba et al. |
| 2015/0349390 A1 | 12/2015 | Aiba et al. |
| 2016/0006006 A1 | 1/2016 | Motokawa et al. |
| 2016/0181579 A1 | 6/2016 | Geshi et al. |
| 2017/0187016 A1* | 6/2017 | Nagasato ............ H01M 50/545 |
| 2017/0200927 A1 | 7/2017 | Hasegawa |
| 2018/0337384 A1* | 11/2018 | Volinski ............. H01M 50/543 |
| 2018/0366711 A1 | 12/2018 | Igarashi |
| 2018/0366717 A1 | 12/2018 | Hu et al. |
| 2019/0372069 A1 | 12/2019 | Lee et al. |
| 2021/0005865 A1 | 1/2021 | Yang et al. |
| 2021/0351468 A1 | 11/2021 | Hur et al. |

FOREIGN PATENT DOCUMENTS

| | | |
|---|---|---|
| CN | 106663761 A | 5/2017 |
| CN | 111406329 A | 7/2020 |
| EP | 3709388 A1 | 9/2020 |
| JP | 2000-067843 A | 3/2000 |
| JP | 4814405 B2 | 11/2011 |
| JP | 2016-504731 A | 2/2016 |
| JP | 2016-091959 A | 5/2016 |
| JP | 6083306 B2 | 2/2017 |
| JP | 2017-157509 A | 9/2017 |
| JP | 2017-162764 A | 9/2017 |
| JP | 6229903 B2 | 11/2017 |
| KR | 10-2012-0097486 A | 9/2012 |
| KR | 10-2013-0056530 A | 5/2013 |
| KR | 10-2016-0020645 A | 2/2016 |
| KR | 10-1720636 B1 | 3/2017 |
| KR | 10-2017-0042407 A | 4/2017 |
| KR | 10-2017-0126490 A | 11/2017 |
| KR | 10-2018-0116339 A | 10/2018 |
| KR | 10-2019-0032887 A | 3/2019 |
| WO | 2014/125807 A1 | 8/2014 |
| WO | 2016/047107 A1 | 3/2016 |
| WO | 2016/179947 A1 | 11/2016 |
| WO | 2017/169729 A1 | 10/2017 |
| WO | 2018/158018 A1 | 9/2018 |
| WO | 2019059538 A | 3/2019 |
| WO | 2020/262806 A1 | 12/2020 |

OTHER PUBLICATIONS

International Search Report (with partial translation) and Written Opinion issued in corresponding International Patent Application No. PCT/KR2020/008689, dated Oct. 26, 2020.

Office Action issued in corresponding Japanese Patent Application No. 2021-541005, dated Apr. 18, 2022.

Office Action issued in corresponding Chinese Patent Application No. 202080031560.7 dated Jan. 3, 2023.

* cited by examiner

BATTERY PACK INCLUDING CONNECTION PLATE, ELECTRONIC DEVICE AND VEHICLE

TECHNICAL FIELD

The present disclosure relates to a battery pack including a connection plate, an electronic device and a vehicle, and more particularly, to a battery pack having an improved energy density and securing long life and stability, and an electronic device and a vehicle including the battery pack.

The present application claims priority to Korean Patent Application No. 10-2019-0079603 filed on Jul. 2, 2019 in the Republic of Korea, the disclosures of which are incorporated herein by reference.

BACKGROUND ART

A secondary battery has high applicability to various product groups and has electrical characteristics with high energy density. The secondary battery is applied not only to portable electronic devices, but also to electric vehicles, hybrid electric vehicles, energy storage systems, and the like, driven by an electric driving source.

The secondary battery is attracting attention as a new energy source for enhancing eco-friendliness and energy efficiency, since by-products are not generated due to the use of energy, along with the primary advantage that the use of fossil fuels may be dramatically reduced.

A battery pack applied to an electric vehicle has a structure in which a plurality of battery modules, each having a plurality of battery cells, are connected to obtain high power. In addition, each battery cell is an electrode assembly including positive and negative electrode current collectors, a separator, active materials, an electrolyte, and the like, and may be repeatedly charged and discharged by electrochemical reactions between the components.

Recently, as a need for a large-capacity structure has been increased along with utilization as an energy storage source, there is an increasing demand for a battery pack having a multi-module structure in which a plurality of battery modules, each having a plurality of secondary batteries connected in series and/or in parallel, are aggregated. At this time, the battery pack could be configured by closely arranging the battery modules such that a large number of secondary batteries may be accommodated in a limited space.

In addition, the conventional battery pack includes a metal plate as a configuration for electrically connecting the plurality of battery modules to each other and also electrically connecting the plurality of cylindrical battery cells provided in each battery module.

However, in order to connect the metal plate mounted on one battery module with another metal plate, it is necessary to provide a separate space for welding the metal plates inside a module housing of the battery module.

Due to the space for welding, the conventional battery module has a limitation in including a larger number of cylindrical battery cells since a dead space is formed in the module housing, thereby greatly lowering the energy density of the battery pack.

Moreover, as a high-rate and large-capacity battery pack is increasingly demanded in recent years, a need for a metal plate capable of transmitting high-rate power of a plurality of battery modules and generating less heat is increasing.

DISCLOSURE

Technical Problem

The present disclosure is designed to solve the problems of the related art, and therefore the present disclosure is directed to providing a battery pack having an improved energy density and securing long life and stability.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:
 a plurality of battery modules arranged in a front and rear direction,
 wherein each of the plurality of battery modules includes:
  a plurality of battery cells arranged in a horizontal direction and having electrode terminals respectively formed at upper and lower portions thereof;
  a module housing configured to have an inner space in which the battery cells are inserted and accommodated; and
  a connection plate including a contact portion located at an upper or lower portion of the plurality of battery cells and having a plurality of connection terminals formed in a portion thereof and respectively electrically contacted and connected to the electrode terminals formed at the plurality of battery cells, and a connection portion bent at least once from one end of the contact portion to extend in at least one direction among an upper direction, a lower direction, a front direction and a rear direction so that the bent and extending region of the connection portion is located on a left or right outer wall of the module housing to contact a part of a connection plate of another battery module.

Moreover, the connection plate may include:
 a first connection plate having a plate shape and located at the upper portion of the plurality of battery cells, the first connection plate including a first contact portion having the connection terminal electrically contacted and connected to the electrode terminal formed at the upper portion of the battery cell, and a first connection portion bent from a front or rear end of the first contact portion to extend in a lower direction and bent from a left or right end of the bent and extending region to extend in a front direction or a rear direction; and
 a second connection plate having a plate shape and located at the lower portion of the plurality of battery cells, the second connection plate including a second contact portion having the connection terminal electrically contacted and connected to the electrode terminal formed at the lower portion of the battery cell, and a second connection portion bent from a left or right end of the second contact portion to extend in an upper direction so that the bent and extending region is contacted and connected to a portion of the first connection portion of the first connection plate.

In addition, the module housing may include a protection portion formed at the left or right outer wall thereof to have a plane so that the connection portion is placed thereon in an overlapping state.

Also, the protection portion may have an air hole formed at an inner side thereof to be opened to the outside.

Moreover, the module housing may include ribs formed at the left and right outer walls thereof to protrude in a horizontal direction and continuously extend linearly.

Further, the module housing may have a guide protrusion formed at the left or right outer wall thereof to protrude in an outer direction.

Also, a part of the guide protrusion may be configured to face the first connection portion of the first connection plate or the second connection portion of the second connection plate.

Moreover, the guide protrusion of the module housing may have a hook structure configured to press a portion of the first connection portion or the second connection portion so that the first connection portion of the first connection plate or the second connection portion of the second connection plate is fixed onto the outer wall of the module housing.

In addition, the module housing may include a coupling protrusion formed on the front outer wall thereof to protrude forward and a guide groove formed at the rear outer wall thereof to be recessed inward.

Further, the module housing may include:
fixing holes formed at left and right outer sides thereof to be perforated in an upper and lower direction; and
fixing tubes configured to extend in an upper and lower direction to be inserted into the fixing holes.

Also, the first connection portion and second connection portion may be located to partially face left and right outer sides of the fixing tube.

Moreover, the battery pack may further comprise:
a tray including a body portion having a plate shape so that the plurality of battery modules are mounted thereon, a front cover portion provided at a front end of the body portion and configured to cover a foremost side of the plurality of battery modules, and a rear cover portion provided at a rear end of the body portion and configured to cover a rearmost side of the plurality of battery modules;
an upper cover configured to cover an upper portion of the plurality of battery modules; and
an electric equipment configured to control a charging/discharging current of the plurality of battery modules.

In addition, the electric equipment may be mounted to an outer side of the front cover portion or the rear cover portion.

Further, each of the body portion of the tray and the upper cover may include a fixing member configured such that a part thereof is fixed to the body portion and the other part thereof protrudes toward the battery module.

Also, the other part of the fixing member may be inserted into the fixing tube and fixed thereto.

Moreover, in another aspect of the present disclosure, there is also provided an electronic device, comprising the battery pack according to the present disclosure.

In addition, in another aspect of the present disclosure, there is also provided a vehicle, comprising the battery pack according to the present disclosure.

Advantageous Effects

According to an embodiment of the present disclosure, since the battery pack includes the connection plates configured such that the coupling portions of the connection portions are made on the left and right sides of the module housing, it is not necessary to provide a separate space in the front and rear direction required for the connection plates to be contacted and connected inside the module housing. Accordingly, it is possible to greatly increase the energy density of the battery pack.

Moreover, according to this embodiment of the present disclosure, since the air hole is formed at the inner side of the protection portion in the present disclosure, the heat generated while the connection portion placed on the protection portion is welded to the connection portion of another connection plate may be discharged through the air hole. Accordingly, it is possible to prevent the module housing or the plurality of cylindrical battery cells accommodated therein from being damaged due to welding of the connection plates. That is, the defective rate of the battery pack may be effectively reduced.

In addition, according to this embodiment of the present disclosure, since the first connection portion and the second connection portion are partially located to face the left and right outer sides of the fixing tube, the plurality of cylindrical battery cells accommodated in the module housing may be located to be spaced apart from the first connection portion and the second connection portion by a predetermined distance. Accordingly, it is possible to reduce the effect of the heat generated while welding the first connection portion and the second connection portion on the plurality of cylindrical battery cells.

Also, according to this embodiment of the present disclosure, since the battery pack of the present disclosure includes at least one electric equipment mounted to an outer side of the front cover portion or the rear cover portion of the tray, electromagnetic waves or magnetic fields generated by the plurality of battery modules may be blocked by the tray, thereby avoiding malfunction of the electric equipment or errors in current or temperature detection.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
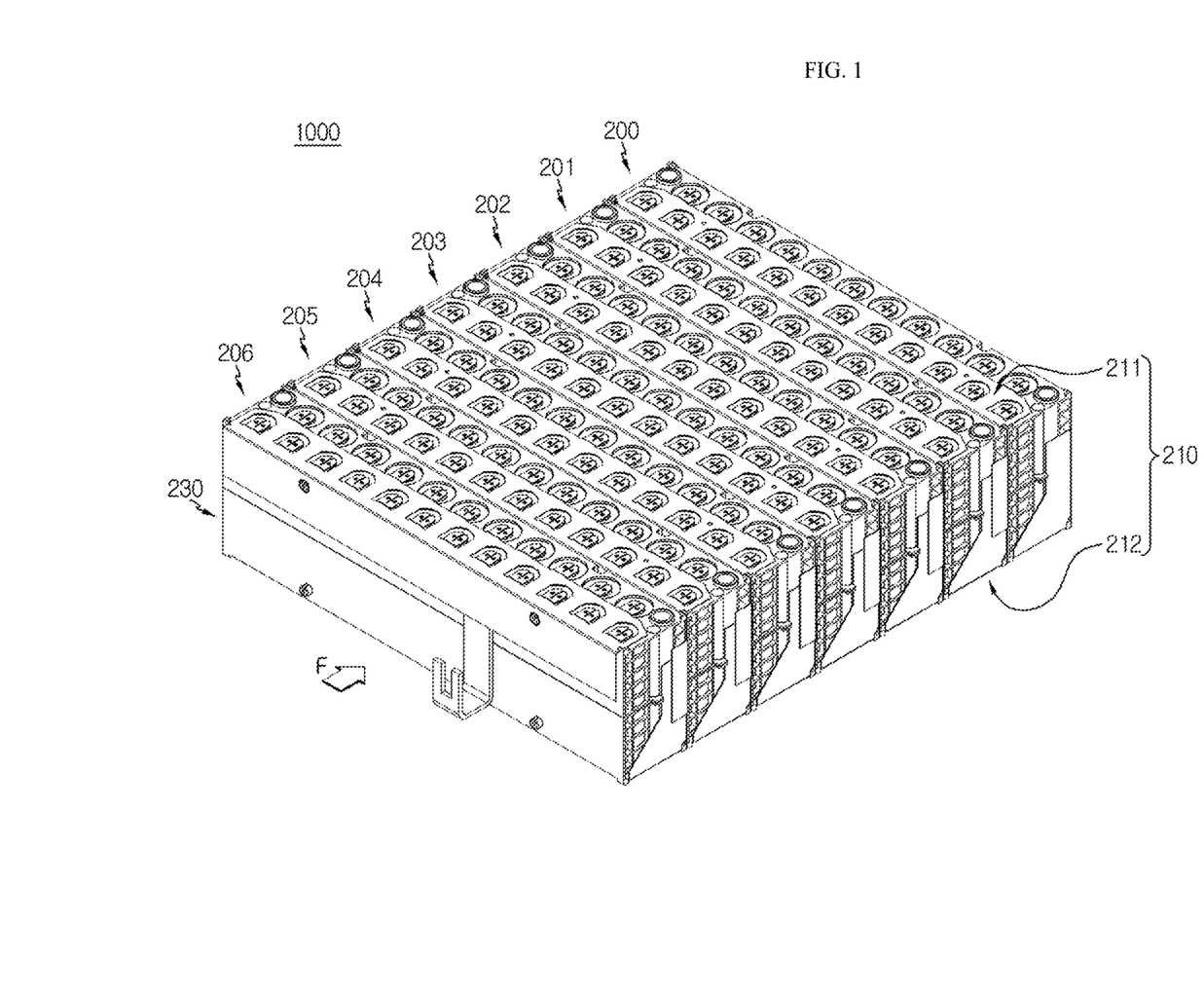
FIG. 1 is a perspective view schematically showing a battery pack according to an embodiment of the present disclosure.

FIG. 1 is a perspective view schematically showing a battery pack according to an embodiment of the present disclosure. Also, FIG. 2 is an exploded perspective view schematically showing components of the battery pack according to an embodiment of the present disclosure.

Figure 2:
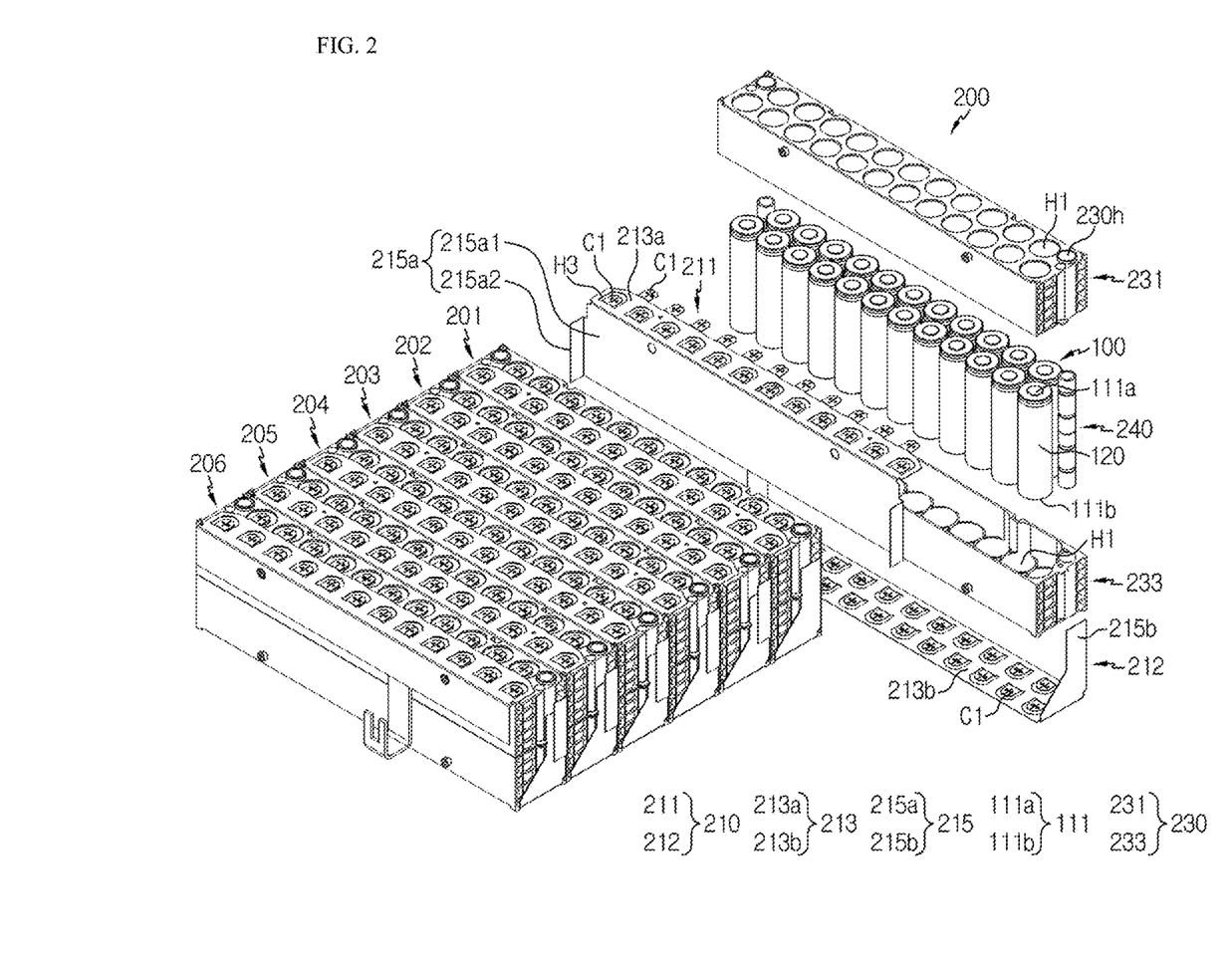
FIG. 2 is an exploded perspective view schematically showing components of the battery pack according to an embodiment of the present disclosure.

Referring to FIGS. 1 and 2, a battery pack 1000 according to an embodiment of the present disclosure includes a plurality of battery modules 200, 201, 202, 203, 204, 205, 206 arranged in a front and rear direction based on the case where viewed in the F direction.

Here, each of the plurality of battery modules 200, 201, 202, 203, 204, 205, 206 may include a plurality of battery cells 100, a module housing 230, and a connection plate 210.

Specifically, the battery cell 100 may be a cylindrical battery cell 100. The cylindrical battery cell 100 may include a cylindrical battery can 120 and an electrode assembly (not shown) accommodated inside the battery can 120.

Also, the cylindrical battery cell 100 may be configured in a form in which the battery can 120 is erected in a vertical direction. Moreover, the battery can 120 includes a material with high electrical conductivity, and, for example, the battery can 120 may include an aluminum alloy or a copper alloy.

In addition, two electrode terminals 111 may be formed at each of upper and lower portions of the battery can 120. Specifically, a positive electrode terminal 111a may be formed at a flat circular top surface of the battery can 120, and a negative electrode terminal 111b may be formed at a flat circular bottom surface of the battery can 120.

Also, an electrical insulating member may be coated on a side portion of the battery can 120.

That is, since the battery can 120 is electrically connected to an electrode (not shown) of the electrode assembly therein, an insulating film (not shown) or an electrically insulating adhesive surrounding the side portion of the battery can 120 may be coated to prevent an unintentional conductive object from contacting the battery can 120 and causing electrical leakage.

Also, the electrode assembly (not shown) may be formed with a rolled structure in a jelly-roll type in a state where a separator is interposed between a positive electrode having a positive electrode plate coated with a positive electrode active material and a negative electrode having a negative electrode plate coated with a negative electrode active material. Moreover, a positive electrode tab may be attached to the positive electrode (not shown) and electrically connected to the positive electrode terminal 111a at the top of the battery can 120. In addition, a negative electrode tab may be attached to the negative electrode (not shown) and electrically connected to the negative electrode terminal 111b at the bottom of the battery can 120.

Further, when viewed in the F direction, the plurality of cylindrical battery cell 100 may be arranged in a horizontal direction to be erected vertically inside the module housing 230.

Here, the horizontal direction may refer to a direction parallel to the ground when the cylindrical battery cell 100 is placed on the ground, and may also refer to at least one direction on a plane perpendicular to the upper and lower direction.

For example, as shown in FIG. 2, the battery module 200 includes 161 cylindrical battery cells 100. In addition, the 161 cylindrical battery cells 100 may be arranged to be adjacent to each other in a horizontal direction in a vertically erected form inside the module housing 230.

Here, the terms indicating directions such as front, rear, left, right, upper and lower, used in this specification, may vary depending on the position of an observer or the shape of an object. However, in this specification, for convenience of description, the front, rear, left, right, upper and lower directions are distinguished based on the case where viewed in the F direction.

Figure 3:
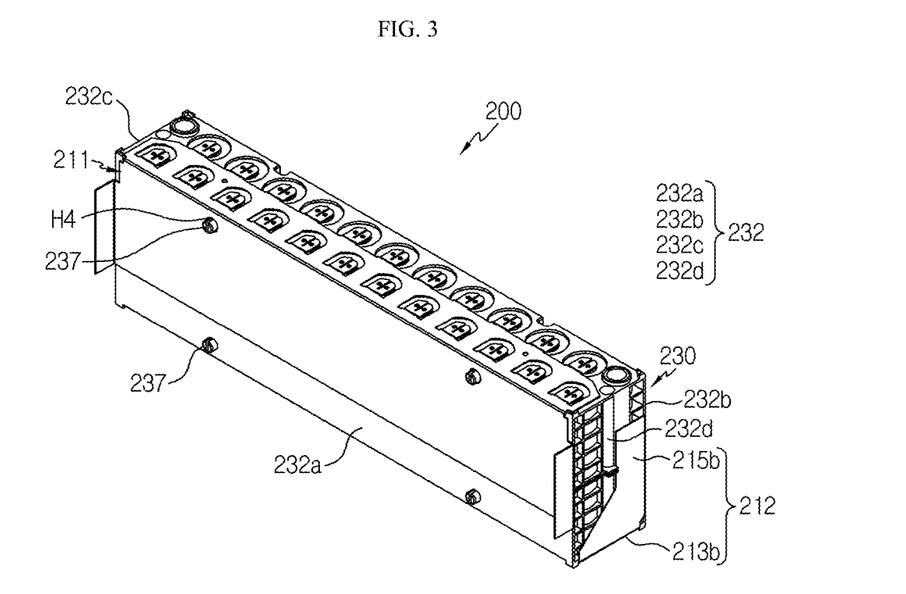
FIG. 3 is a front perspective view schematically showing some battery modules of the battery pack according to an embodiment of the present disclosure.

FIG. 3 is a front perspective view schematically showing some battery modules of the battery pack according to an embodiment of the present disclosure. Also, FIG. 4 is a rear perspective view schematically showing some battery modules of the battery pack according to an embodiment of the present disclosure.

Figure 4:
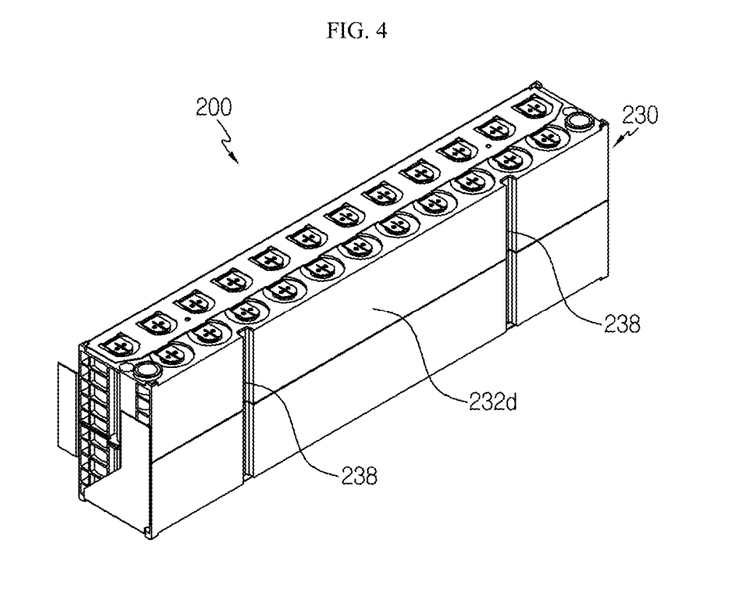
FIG. 4 is a rear perspective view schematically showing some battery modules of the battery pack according to an embodiment of the present disclosure.

Referring to FIGS. 3 and 4 along with FIG. 2, the module housing 230 may have an inner space in which the plurality of cylindrical battery cells 100 may be inserted and accommodated. The module housing 230 may be made of an electrically insulating material, and, for example, the module housing 230 may be made of a plastic material. More specifically, the plastic material may be polyvinyl chloride.

Specifically, the module housing 230 may have a plurality of hollows H1 formed to surround an outer surface of the cylindrical battery cell 100. Further, the module housing 230 may have left and right outer walls 232c, 232d and front and rear outer walls 232a, 232b.

In addition, the module housing 230 may include an upper case 231 and a lower case 233.

Here, the upper case 231 may have a hollow H1 formed to surround the outer surface of the upper portion of the cylindrical battery cell 100. Moreover, the lower case 233 is fastened to a lower portion of the upper case 231 and may have a hollow H1 formed to surround the outer surface of the lower portion of the cylindrical battery cell 100.

In addition, a coupling protrusion 237 protruding forward from the outer surface of the outer wall 232a may be formed on a part H4 of the front outer wall 232a of the module housing 230. In addition, a guide groove 238 recessed from the outer surface of the outer wall 232b in an inner direction in which the battery cell 100 is located may be provided at the rear outer wall 232b of the module housing 230 so that the coupling protrusion 237 is inserted therein.

For example, as shown in FIG. 3, four coupling protrusions 237 may be formed on the front outer wall 232a of the module housing 230. In addition, as shown in FIG. 4, two guide grooves 238 may be formed at the rear outer wall 232b of the module housing 230.

Therefore, according to this configuration of the present disclosure, since the coupling protrusion 237 of the module housing 230 according to the present disclosure may be inserted into a guide groove 238 of another battery module 201 to guide the arrangement of the plurality of battery modules 200, 201, 202, 203, 204, 205, 206, the plurality of battery modules 200, 201, 202, 203, 204, 205, 206 may be easily arranged and fixed not to be easily separated from each other.

In addition, the connection plate 210 may include a contact portion 213 and a connection portion 215. Specifically, the contact portion 213 may be located at an upper portion or a lower portion of the plurality of battery cells 100. That is, the contact portion 213 may be located to face the electrode terminals 111 formed at the upper portion or the lower portion of the plurality of battery cells 100. Further, a plurality of connection terminals C1 may be provided in a part of the contact portion 213 to be electrically connected to the electrode terminals 111 formed at the plurality of battery cells 100, respectively.

Further, the connection plate 210 may include an electrically conductive material. For example, the electrically conductive material may be a metal alloy containing copper, nickel, aluminum, gold, silver, or the like as a main material.

More specifically, at least one connection opening H3 perforated vertically may be formed at the contact portion 213. In addition, the connection terminal C1 of the connection plate 210 may be formed to protrusively extend in the horizontal direction from an inner side of the rim of the connection opening H3 so as to be in electrical contact and connection with the electrode terminals 111 formed at the plurality of cylindrical battery cells 100. In addition, the protrusively extending end of the connection terminal C1 may have a branched structure that is split into two sides based on the protrusively extending direction.

For example, as shown in FIG. 2, 12 connection openings H3 may be formed in one connection plate 211. Also, 23 connection openings H3 may be formed in the other connection plate 212. In addition, a connection terminal C1 may be formed at the connection opening H3 to extend in a horizontal direction from an inner side of the rim thereof or from a front and rear end of the contact portion 213 of the connection plate 210. Further, the connection terminal C1 may have a branched structure divided into two sides with respect to the protrusively extending direction thereof.

In addition, the connection portion 215 may be bent at least once to extend in at least one direction among an upper direction, a lower direction, a front direction and a rear direction from one end of the contact portion 213. For example, as shown in FIG. 2, the connection portion 215a of the connection plate 211 located at the upper portion of the plurality of battery cells 100 may have a structure 215a1 that is bent once from the front end of the contact portion 213 to extend in a lower direction. In addition, the connection portion 215a may have a structure 215a2 that is bent once again from both left and right ends of the bent and extending structure 215a1 to extend in a front direction. That is, the connection portion 215 has two bent and extending structures in total. In addition, the connection portion 215b of the connection plate 212 located at the lower portion of the plurality of battery cells 100 may have a structure that is bent once from both left and right ends of the contact portion 213b to extend in an upper direction.

Moreover, the bent and extending region of the connection portion 215 may be located on the left or right outer wall 232 of the module housing 230. In addition, the connection portion 215 may be configured to contact a part of a connection plate 210 of another neighboring battery module 200 on the left or right outer wall 232. For example, the plurality of battery modules 200 may be electrically connected in series by the connection plate 210.

Therefore, according to this configuration of the present disclosure, since the battery pack 1000 includes the connection plates 210 configured such that the coupling portions of the connection portions 215 are made on the left and right sides of the module housing 230, it is not necessary to provide a separate space in the front and rear direction required for the connection plates 211, 212 to be contacted and connected inside the module housing 230. Accordingly, it is possible to greatly increase the energy density of the battery pack 1000.

More specifically, the connection plate 210 may include two types of plates, namely a first connection plate 211 and a second connection plate 212.

Here, the first connection plate 211 may include a first contact portion 213a and a first connection portion 215a. The first contact portion 213a may have a plate shape. Here, the plate shape refers to a flat plate shape where upper and lower surfaces are wider than left and right surfaces. In addition, the first contact portion 213a is located at the upper portion of the plurality of battery cells 100 where the electrode terminals 111 are provided, and the connection terminal C1 may be configured to be electrically connected to the electrode terminal 111 formed at the upper portion of the battery cell 100.

Further, the first connection portion 215a may have a bent and extending structure 215a1 that is bent from a front or rear end of the first contact portion 213a to extend in a lower direction, and may also have a bent and extending structure 215a2 that is bent again from a left or right end of a part of the bent and extending structure 215a1 to extend in a front direction or a rear direction.

For example, as shown in FIG. 2, the first contact portion 213a of the first connection plate 211 may have a plate shape and be located at the upper portion of the plurality of battery cells 100. The contact portion 213a may be configured such that the plurality of connection terminals C1 are electrically contacted and connected to the electrode terminals 111 formed at the upper portion of the battery cells 100.

In addition, the first connection plate 211 may include two first connection portions 215a that are bent from the front end of the first contact portion 213a to extend in a lower direction and also are bent from both left and right ends of the bent and extending region to extend in a front direction or a rear direction.

Here, the second connection plate 212 may include a second contact portion 213b and a second connection portion 215b. The second contact portion 213b may have a plate shape. Here, the plate shape refers to a flat plate shape where upper and lower surfaces are wider than left and right surfaces. In addition, the second contact portion 213b may be located at the lower portion of the plurality of battery cells 100 where the electrode terminals 111 are provided. The second contact portion 213b may be configured such that the plurality of connection terminals C1 are electrically contacted and connected to the electrode terminals 111 formed at the lower portion of the battery cells 100.

Further, the second connection portion 215b may be configured to be bent from the left or right end of the second contact portion 213b to extend in an upper direction, and the bent and extending region may be contacted and connected to a part of the first connection portion 215a of the first connection plate 211.

For example, as shown in FIG. 2, the second contact portion 213b of the second connection plate 212 may have a plate shape and be located at the lower portion of the plurality of battery cells 100. The plurality of connection terminals C1 of the second contact portion 213b may be electrically contacted and connected to the electrode terminals 111 formed at the lower portion of the battery cells 100.

In addition, the second connection plate 212 include two second connection portions 215b that are bent from both left and right ends of the second contact portion 213b to extend in an upper direction so that the bent and extending regions are contacted and connected to a portion of the first connection portion 215a of the first connection plate 211.

Figure 5:
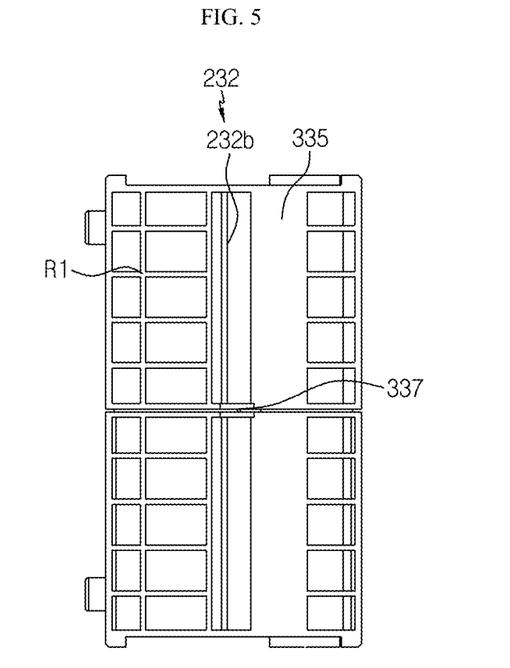
FIG. 5 is a side view schematically showing some components of some battery modules of the battery pack according to an embodiment of the present disclosure.

FIG. 5 is a side view schematically showing some components of some battery modules of the battery pack according to an embodiment of the present disclosure.

Referring to FIG. 5 along with FIGS. 3 and 4, the module housing 230 may include a protection portion 335. The protection portion 335 may be configured to have a plane on the left outer wall 232c or the right outer wall 232d corresponding to the connection portion 215. The protection portion 335 may be configured such that the connection portion 215 is placed thereon in an overlapping state. Further, the protection portion 335 may have a predetermined thickness in a left and right direction.

For example, as shown in FIG. 5, the protection portion 335 may be provided at the right outer wall 232 of the module housing 230. Although not shown in FIG. 5, the protection portion 335 may also be provided at the left outer wall 232 of the module housing 230.

Further, the module housing 230 may include ribs R1 provided at the left and right outer walls 232 thereof and configured to protrude in a horizontal direction and continuously extend linearly. For example, as shown in FIG. 5, the right outer wall 232b of the module housing 230 may include a grid-shaped rib R1 extending in the front and rear direction and in the upper and lower direction in a region except for the protection portion 335. Although not shown, the left outer wall 232 of the module housing 230 may also include a grid-shaped rib R1 extending in the front and rear direction and the upper and lower direction in a region except for the protection portion 335.

Therefore, according to this configuration of the present disclosure, since the ribs R1 are provided at the left and right outer walls 232 of the module housing 230, it is possible to reduce the weight of the battery module 200 and also effectively secure the mechanical rigidity of the module housing 230.

Figure 6:
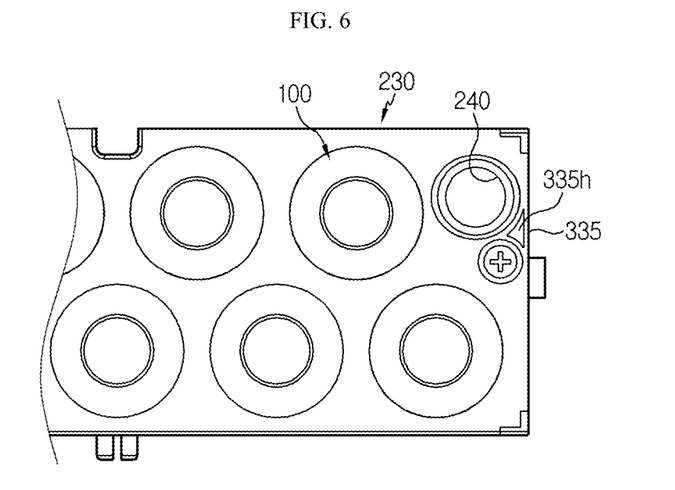
FIG. 6 is a partial plan view schematically showing some components of some battery modules of the battery pack according to an embodiment of the present disclosure.

FIG. 6 is a partial plan view schematically showing some components of some battery modules of the battery pack according to an embodiment of the present disclosure.

Referring to FIG. 6 along with FIGS. 3 and 5, an air hole 335h may be formed at an inner side of the protection portion 335 to be perforated in an upper and lower direction or to be recessed inward at an upper portion thereof. The air hole 335h may be opened in an upper direction.

The air hole 335h may be formed at the inner side of the protection portion 335 and configured to discharge heat generated during the welding process of the connection portion 215 of the connection plate 210 to the outside by conducting the heat to the air. For example, as shown in FIG. 6, the protection portion 335 may be configured to have a predetermined thickness, and the air hole 335h may be formed at an inner side of the protection portion 335 where the cylindrical battery cell 100 is located.

Therefore, according to this configuration of the present disclosure, since the air hole 335h is formed at the inner side of the protection portion 335 in the present disclosure, the heat generated while the connection portion 215b placed on the protection portion 335 is welded to the connection portion 215a of another connection plate 211 may be discharged through the air hole 335h. Accordingly, it is possible to prevent the module housing 230 or the plurality of cylindrical battery cells 100 accommodated therein from being damaged due to welding of the connection plates 210. That is, the defective rate of the battery pack 1000 may be effectively reduced.

Referring to FIG. 5 again along with FIG. 2, the module housing 230 may include a guide protrusion 337 protruding outward from the left or right outer wall 232. For example, as shown in FIG. 5, the guide protrusion 337 may be configured to protrude in a right direction on the right outer wall 232b of the module housing 230.

Therefore, according to this configuration of the present disclosure, since the guide protrusion 337 is configured to surround the outer side of the module housing 230, for example, by supporting the pack housing (not shown), the guide protrusion 337 may play the role of setting a separation distance between the module housing 230 and the pack housing. That is, when the inner surface of the pack housing comes into contact with the connection portion 215 of the connection plate 210, the guide protrusion 337 may prevent the connection plate 210 from being damaged, disconnected or short-circuited.

In addition, a part of the guide protrusion 337 may be configured to face the first connection portion 215a of the first connection plate 211 or the second connection portion 215b of the second connection plate 212. For example, as shown in FIG. 5, the guide protrusion 337 may be configured to face and support one side of the second connection plate 212.

Figure 7:
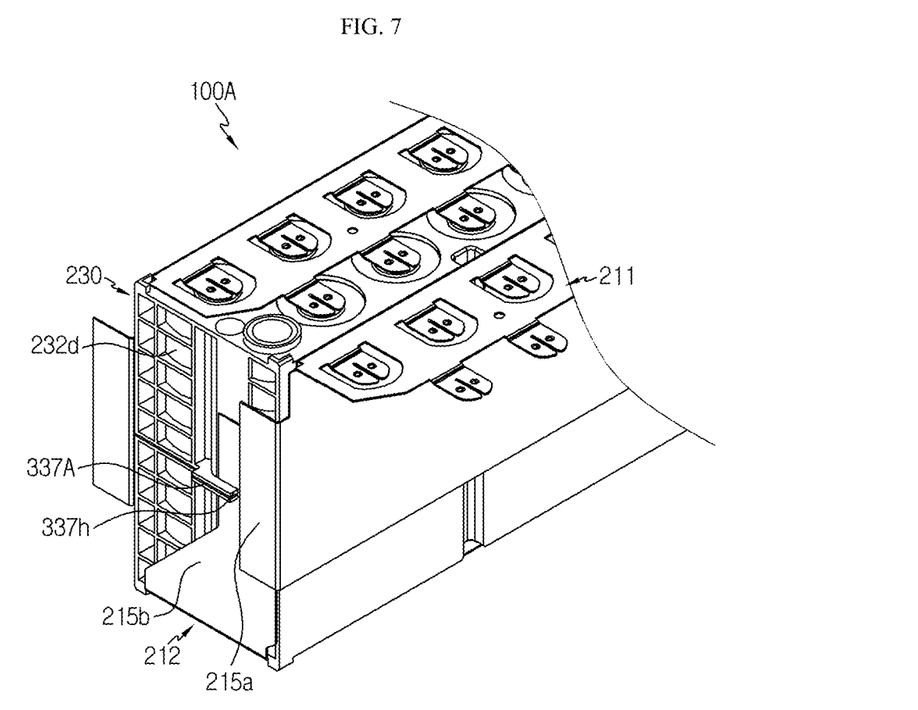
FIG. 7 is a partial perspective view schematically showing some components of some battery modules of a battery pack according to another embodiment of the present disclosure.

FIG. 7 is a partial perspective view schematically showing some components of some battery modules of a battery pack according to another embodiment of the present disclosure.

Referring to FIG. 7, a hook structure 337h may be further formed at a guide protrusion 337A of the module housing 230 of a battery module 100A according to another embodiment of the present disclosure, as compared to the guide protrusion 337 of FIG. 5. The hook structure 337h of the guide protrusion 337A may be configured to press a portion of the first connection portion 215a or the second connection portion 215b so that the first connection portion 215a of the first connection plate 211 or the second connection portion 215b of the second connection plate 212 is fixed onto the outer wall 232d of the module housing 230.

For example, as shown in FIG. 7, a guide protrusion 337A may be provided on the right outer wall 232d of the module housing 230, and a hook structure 337h configured to press and fix the second connection portion 215b of the second connection plate 212 may be formed at the guide protrusion 337A.

Therefore, according to this configuration of the present disclosure, since the hook structure 337h configured to press and fix the connection portion 215 of the connection plate 210 is formed at the guide protrusion 337A provided to the module housing 230, the connection portions 215a, 215b of the connection plates 211, 212 may be welded easily, and the connection portion 215 of the connection plate 210 may be stably fixed by the hook structure even when the battery pack 1000 is vibrated.

Referring to FIG. 2 again, the module housing 230 may include a fixing hole 230h and a fixing tube 240. Specifically, the fixing hole 230h may be located at an outer side in a left and right direction based on the center of the body of the module housing 230. The fixing hole 230h may be shaped such that a part of the body of the module housing 230 is perforated in the upper and lower direction. For example, as shown in FIG. 2, fixing holes 230h may be formed at both left and right outer sides of the body of the module housing 230.

In addition, the fixing tube 240 may have a tube shape extending in an upper and lower direction. The fixing tube 240 may be configured to be inserted into the fixing hole 230h.

Moreover, the fixing tube 240 may be used such that a fixing bolt (not shown) for fixing the battery module 200 to the floor or ceiling is secured at a specific installation location.

Therefore, according to this configuration of the present disclosure, since the fixing tube 240 is provided to the module housing 230, a fixing member (not shown) may be easily inserted and fixed therein so that the battery pack 1000 including the plurality of battery modules 200 may be stably fixed at the installation site.

Referring to FIG. 2 again, portions of the first connection portion 215a and the second connection portion 215b in contact with each other may be located to face the left and right outer sides of the fixing tube 240. For example, as shown in FIG. 2, two first connection portions 215a provided to the first connection plate 211 and two second connection portions 215b provided to both left and right sides of the second connection plate 212 may be joined to each other. In this case, bonding may be performed by laser welding. In addition, the joined portions of the first connection portion 215a and the second connection portion 215b may be located to face the left and right outer sides of the fixing tube 240.

Thus, according to this configuration of the present disclosure, since the first connection portion 215a and the second connection portion 215b are partially located to face the left and right outer sides of the fixing tube 240, the plurality of cylindrical battery cells 100 accommodated in the module housing 230 may be located to be spaced apart from the first connection portion 215a and the second connection portion 215b by a predetermined distance. Accordingly, it is possible to reduce the effect of the heat generated while welding the first connection portion 215a and the second connection portion 215b on the plurality of cylindrical battery cells 100.

Figure 8:
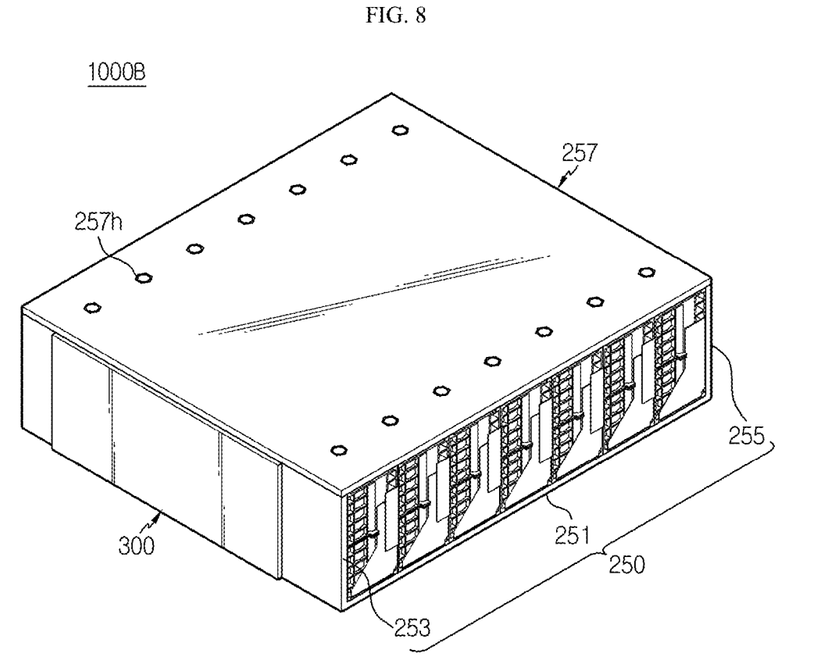
FIG. 8 is a perspective view schematically showing a battery pack according to still another embodiment of the present disclosure.

FIG. 8 is a perspective view schematically showing a battery pack according to still another embodiment of the present disclosure. Also, FIG. 9 is a perspective view schematically showing some components of the battery pack according to still another embodiment of the present disclosure.

Figure 9:
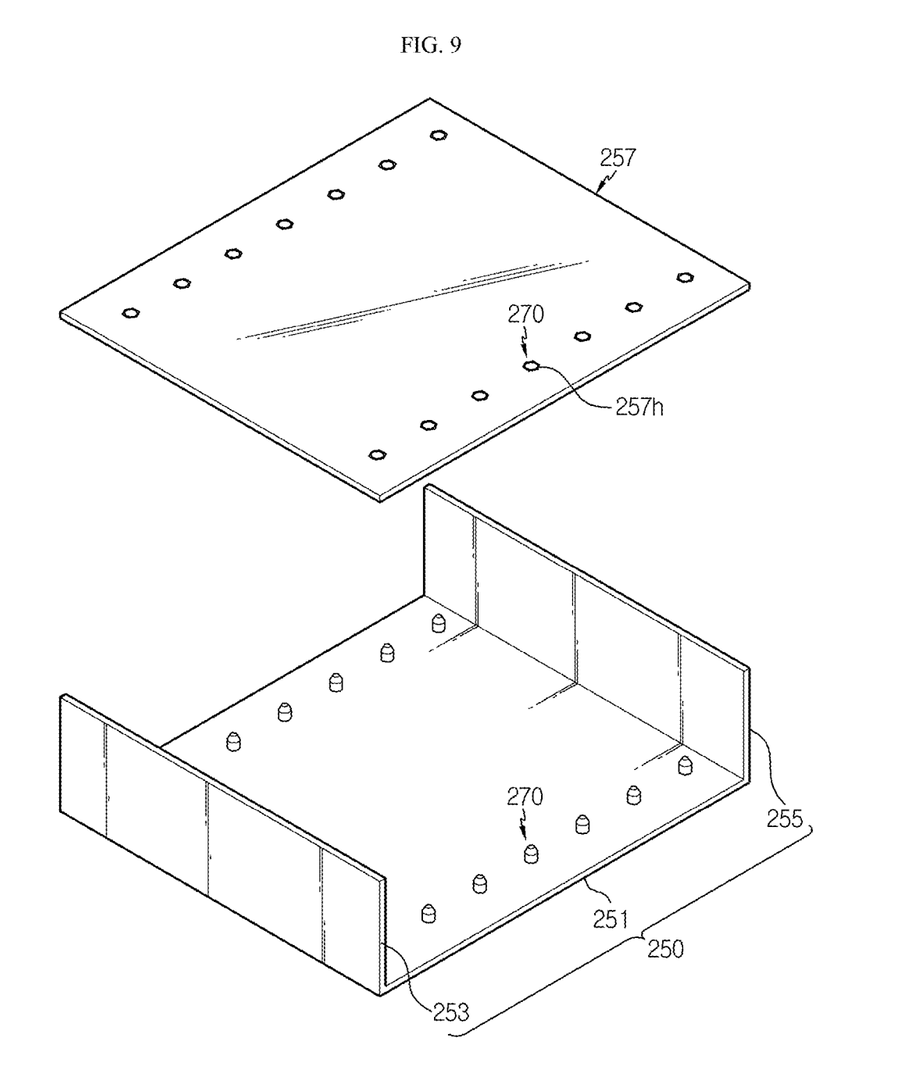
FIG. 9 is a perspective view schematically showing some components of the battery pack according to still another embodiment of the present disclosure.

Referring to FIGS. 8 and 9, the battery pack 1000 may include a tray 250, an upper cover 257, and at least one electric equipment (not shown).

Specifically, the tray 250 may include a body portion 251, a front cover portion 253, and a rear cover portion 255. The tray 250 may be made of, for example, a metal material such as steel or stainless steel with excellent mechanical rigidity.

More specifically, the body portion 251 may have a plate shape so that the plurality of battery modules 200 are mounted to an upper portion thereof. The body portion 251 may have an upper surface larger than the total area of the plurality of battery modules 200.

The front cover portion 253 may be provided at a front end of the body portion 251 and configured to cover a foremost side of the plurality of battery modules 200. The front cover portion 253 may have a shape that is bent from the front end of the body portion 251 to extend in an upper direction. In addition, the rear cover portion 255 may be provided at a rear end of the body portion 251 and configured to cover a rearmost side of the plurality of battery modules 200. The rear cover portion 255 may have a shape that is bent from the rear end of the body portion 251 to extend in an upper direction.

For example, as shown in FIG. 8, a battery pack 1000B according to another embodiment may further include a tray 250 in which the plurality of battery modules 200 are accommodated. Here, the tray 250 may be made of a material such as steel or stainless steel.

Specifically, the tray 250 may include a body portion 251 configured such that the plurality of battery modules 200 are mounted to an upper portion thereof, a front cover portion 253 configured to cover a foremost side of the plurality of battery modules 200, and a rear cover portion 255 configured to cover a rearmost side of the plurality of battery modules 200.

Further, the battery pack 1000B may include an upper cover 257 configured to cover an upper portion of the plurality of battery modules 200. Front and rear ends of the upper cover 257 may be connected or coupled to the front cover portion 253 and the rear cover portion 255 of the tray 250.

Therefore, according to this configuration of the present disclosure, since the battery pack 1000B includes the tray 250 and the upper cover 257, it is possible to protect the plurality of battery modules 200, 201, 202, 203, 204, 205, 206 from an external impact.

In addition, the battery pack 1000B may further include an electric equipment (not shown) configured to control a charging/discharging current of the plurality of battery modules.

The at least one electric equipment may be mounted to an outer side of the front cover portion 253 or the rear cover portion 255. For example, as shown in FIG. 8, at a front outer side of the front cover portion 253 of the tray 250, a battery management system (BMS) 300 including a plurality of electric equipment (not shown) may be provided inside a BMS housing that covers the battery management system 300.

Here, representative examples of the electric equipment included in the battery pack 1000 include a relay, a current sensor, and a fuse. These electric equipment are components for managing the charging and discharging of the cylindrical battery cells 100 included in the battery pack 1000 and securing safety, and may be regarded as essential components included in most battery packs 1000.

Therefore, according to this configuration of the present disclosure, since the battery pack 1000 of the present disclosure includes at least one electric equipment mounted to an outer side of the front cover portion 253 or the rear cover portion 255 of the tray 250, electromagnetic waves or magnetic fields generated by the plurality of battery modules 200 may be blocked by the tray 250, thereby avoiding malfunction of the electric equipment or errors in current or temperature detection.

Referring to FIGS. 8 and 9 again, a fixing member 270 may be provided to each of the body portion 251 and the upper cover 257 of the tray 250. A part of the fixing member 270 may be fixed to the body portion 251 and the other part of the fixing member 270 may be shaped to protrude toward the battery module 200.

In addition, each of the body portion 251 and the upper cover 257 of the tray 250 may have an insert hole 257h in which a part of the fixing member 270 may be inserted and fixed. Moreover, the insert hole 257h may be perforated in an upper and lower direction. For example, the fixing member 270 may have a press-in nut (or, a PEM nut). The press-in nut may be configured to be inserted and fixed in the insert hole 257h.

Moreover, a plurality of fixing members 270 may be provided to a lower surface of the upper cover 257. The fixing member 270 may be configured to protrude in a lower direction. That is, the fixing member 270 inserted into the insert hole 257h may have a horn shape pointed in a lower direction.

In addition, the body portion 251 of the tray 250 may include a plurality of fixing members 270. The fixing member 270 may be configured to protrude in an upper direction. That is, the fixing member 270 inserted into the insert hole 257h may have a horn shape pointed in an upper direction.

Therefore, according to this configuration of the present disclosure, since the fixing members 270 configured to fix the battery modules 200, 201, 202, 203, 204, 205, 206 to each of the body portion 251 and the upper cover 257 of the tray 250 are provided, the battery modules 200, 201, 202, 203, 204, 205, 206 may be fixed without shaking in a state of being mounted to the upper cover 257 and the body portion 251 of the tray 250.

In addition, an electronic device according to the present disclosure may include the battery pack 1000. Moreover, the electronic device (not shown) may include a case (not shown) that accommodates the battery pack 1000 therein.

Moreover, a vehicle (not shown) according to the present disclosure may include the battery pack 1000. Moreover, the vehicle may be, for example, an electric vehicle having an electric motor (not shown) powered by the battery pack 1000.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 1000: battery pack | 100: battery cell |
| 200, 201, 202, 203, 204, 205, 206: battery modules | |
| 230: module housing | 231, 233: upper case, lower case |
| 232, 232a, 232b, 232c, 232d: outer wall, outer walls | |
| 210, 211, 212: connection plate, first connection plate, second connection plate | |

-continued

| Reference Signs | |
|---|---|
| 213, 213a, 213b: contact portion, first contact portion, second contact portion | |
| 215, 215a, 215b: connection portion, first connection portion, second connection portion | |
| 335: protection portion | 337: guide protrusion |
| 337h: hook structure | |
| 111, 111a, 111b: electrode terminal, positive electrode terminal, negative electrode terminal | |
| 230h: fixing hole | 240: fixing tube |
| 250: tray | 251, 253, 255: body portion, front cover portion, rear cover portion |
| 257: upper cover | 300: BMS (electric equipment) |
| 270: fixing member | H1: hollow |

INDUSTRIAL APPLICABILITY

The present disclosure relates to a battery pack including a connection plate. In addition, the present disclosure is available for industries associated with electronic devices or vehicles including the battery pack.

What is claimed is:

1. A battery pack, comprising:
a plurality of battery modules disposed in a front-to-rear direction, wherein each of the plurality of battery modules includes:
a plurality of battery cells arranged in a horizontal direction and having electrode terminals respectively at upper and lower portions thereof;
a module housing configured to have an inner space in which the battery cells are accommodated; and
a connection plate including a contact portion at an upper or lower portion of the plurality of battery cells and having a plurality of connection terminals formed in a portion thereof and respectively electrically contacted and connected to the electrode terminals at the plurality of battery cells, and a connection portion bent at least once from one end of the contact portion to extend in at least one direction among an upper direction, a lower direction, the front-to-rear direction so that the bent and extending region of the connection portion is on a left or right outer wall of the module housing to contact a part of a connection plate of another battery module,
wherein each module housing includes a protection portion at the left or right outer wall thereof to have a plane so that the connection portion is placed thereon in an overlapping state, and
wherein the protection portion of each module housing has an air hole at an inner side thereof to be opened to an outside.

2. The battery pack according to claim 1, wherein each connection plate of each respective battery module includes:
a first connection plate having a plate shape and located at the upper portion of the plurality of battery cells, the first connection plate including a first contact portion having the connection terminal electrically contacted and connected to the electrode terminal at the upper portion of the battery cell, and a first connection portion bent from a front or rear end of the first contact portion to extend in the lower direction and bent from a left or right end of the bent and extending region to extend in the front-to-rear direction; and a second connection plate having a plate shape and located at the lower portion of the plurality of battery cells, the second connection plate including a second contact portion having the connection terminal electrically contacted and connected to the electrode terminal at the lower portion of the battery cell, and a second connection portion bent from a left or right end of the second contact portion to extend in the upper direction so that the bent and extending region is contacted and connected to a portion of the first connection portion of the first connection plate of an adjacent battery module.

3. The battery pack according to claim 1, wherein each module housing includes ribs at the left and right outer walls thereof to protrude in the horizontal direction and continuously extend linearly.

4. The battery pack according to claim 2, wherein each module housing of each respective battery module has a guide protrusion at the left or right outer wall thereof to protrude in an outer direction, and
wherein a part of the guide protrusion is configured to face the first connection portion of the first connection plate or the second connection portion of the second connection plate of a respective battery module.

5. The battery pack according to claim 4, wherein the guide protrusion of each module housing of each respective battery module has a hook structure configured to press a portion of the first connection portion or the second connection portion of a respective battery module so that the first connection portion of the first connection plate or the second connection portion of the second connection plate is fixed onto the outer wall of the module housing.

6. The battery pack according to claim 2, wherein each module housing includes a coupling protrusion on a front outer wall thereof to protrude forward and a guide groove at a rear outer wall thereof to be recessed inward.

7. The battery pack according to claim 2, wherein each module housing includes:
fixing holes at left and right outer sides thereof; and
fixing tubes configured to extend in the upper direction to be inserted into the fixing holes.

8. The battery pack according to claim 7, wherein the first connection portion and second connection portion of each respective module housing partially face left and right outer sides of respective fixing tubes.

9. The battery pack according to claim 7, further comprising:
a tray including a body portion having a plate shape so that the plurality of battery modules are mounted thereon, a front cover portion provided at a front end of the body portion and configured to cover a foremost side of the plurality of battery modules, and a rear cover portion provided at a rear end of the body portion and configured to cover a rearmost side of the plurality of battery modules;
an upper cover configured to cover an upper portion of the plurality of battery modules; and
an electric equipment configured to control a charging/discharging current of the plurality of battery modules.

10. The battery pack according to claim 9, wherein the electric equipment is mounted to an outer side of the front cover portion or the rear cover portion.

11. The battery pack according to claim 9, wherein each of the body portion of the tray and the upper cover includes a fixing member configured such that a first part of the fixing member is fixed to the body portion and a second part of the fixing member protrudes toward a respective battery module, and
wherein the second part of the fixing member is inserted into a respective fixing tube of the respective battery module and fixed thereto.

12. An electronic device, comprising the battery pack as defined in claim 1.

13. A vehicle, comprising the battery pack as defined in claim 1.

14. A battery pack, comprising:
a plurality of battery modules disposed in a front-to-rear direction, wherein each of the plurality of battery modules includes:
a plurality of battery cells arranged in a horizontal direction and having electrode terminals respectively at upper and lower portions thereof;
a module housing configured to have an inner space in which the battery cells are accommodated; and
a connection plate including a contact portion at an upper or lower portion of the plurality of battery cells and having a plurality of connection terminals formed in a portion thereof and respectively electrically contacted and connected to the electrode terminals at the plurality of battery cells, and a connection portion bent at least once from one end of the contact portion to extend in at least one direction among an upper direction, a lower direction, the front-to-rear direction so that the bent and extending region of the connection portion is on a left or right outer wall of the module housing to contact a part of a connection plate of another battery module,
wherein each connection plate of each respective battery module includes:
a first connection plate having a plate shape and located at the upper portion of the plurality of battery cells, the first connection plate including a first contact portion having the connection terminal electrically contacted and connected to the electrode terminal at the upper portion of the battery cell, and a first connection portion bent from a front or rear end of the first contact portion to extend in the lower direction and bent from a left or right end of the bent and extending region to extend in the front-to-rear direction; and
a second connection plate having a plate shape and located at the lower portion of the plurality of battery cells, the second connection plate including a second contact portion having the connection terminal electrically contacted and connected to the electrode terminal at the lower portion of the battery cell, and a second connection portion bent from a left or right end of the second contact portion to extend in the upper direction so that the bent and extending region is contacted and connected to a portion of the first connection portion of the first connection plate of an adjacent battery module, and
wherein each module housing includes:
fixing holes at left and right outer sides thereof; and
fixing tubes configured to extend in the upper direction to be inserted into the fixing holes.

15. The battery pack according to claim 14, wherein the first connection portion and second connection portion of each respective module housing partially face left and right outer sides of respective fixing tubes.

16. The battery pack according to claim 14, further comprising:

a tray including a body portion having a plate shape so that the plurality of battery modules are mounted thereon, a front cover portion provided at a front end of the body portion and configured to cover a foremost side of the plurality of battery modules, and a rear cover portion provided at a rear end of the body portion and configured to cover a rearmost side of the plurality of battery modules;

an upper cover configured to cover an upper portion of the plurality of battery modules; and an electric equipment configured to control a charging/discharging current of the plurality of battery modules.

17. The battery pack according to claim 16, wherein the electric equipment is mounted to an outer side of the front cover portion or the rear cover portion.

* * * * *